United States Patent [19]

Kunkle et al.

[11] 4,395,272

[45] Jul. 26, 1983

[54] PRESSURE SIZING OF FLOAT GLASS

[75] Inventors: Gerald E. Kunkle, New Kensington; John E. Sensi, Arnold; Joseph A. Gulotta, New Kensington, all of Pa.

[73] Assignee: PPG Industries, Inc., Pittsburgh, Pa.

[21] Appl. No.: 326,890

[22] Filed: Dec. 2, 1981

[51] Int. Cl.$^3$ .............................................. C03B 18/08
[52] U.S. Cl. ..................................... 65/99.5; 65/99.6; 65/182.4
[58] Field of Search ..................... 65/99.5, 99.6, 182.4

[56] References Cited

U.S. PATENT DOCUMENTS

| | | |
|---|---|---|
| 3,241,937 | 3/1966 | Michalik et al. . |
| 3,241,938 | 3/1966 | Michalik . |
| 3,241,939 | 3/1966 | Michalik . |
| 3,248,197 | 4/1966 | Michalik et al. . |
| 3,345,149 | 10/1967 | Michalik et al. . |
| 3,432,283 | 3/1969 | Galey . |
| 3,615,315 | 10/1971 | Michalik et al. . |
| 3,749,563 | 7/1973 | Stingelin . |
| 3,841,857 | 10/1974 | Harcuba . |
| 3,843,344 | 10/1974 | Galey . |
| 3,883,338 | 5/1975 | Stingelin . |
| 3,885,944 | 5/1975 | Stingelin . |

Primary Examiner—Arthur D. Kellogg
Attorney, Agent, or Firm—Dennis G. Millman

[57] ABSTRACT

A continuous ribbon of glass is reduced in thickness while supported on molten metal by imposing super-atmospheric pressure over a molten glass layer in a chamber where the glass is maintained in contact with the side walls of the chamber. One aspect features metering the glass layer into the pressure chamber at substantially full width. Another aspect involves pressure sizing the glass layer at temperatures above 2100° F. (1150° C.).

8 Claims, 2 Drawing Figures

PRESSURE SIZING OF FLOAT GLASS

BACKGROUND OF THE INVENTION

This invention relates to the manufacture of flat glass wherein the glass is formed into a flat sheet while supported on a pool of molten metal, commonly referred to as the float process. More particularly, this invention relates to a process for sizing the glass by means of pressure while supported on the molten metal so as to minimize distortion in the product glass.

In a float forming process molten glass is delivered onto a pool of molten metal, usually tin or an alloy thereof, and thereafter formed into a continuous ribbon or sheet of glass. Under the competing forces of gravity and surface tension, the molten glass on the molten metal spreads outwardly to an equilibrium thickness of about 6.6 millimeters. In order to produce glass of thicknesses less than the equilibrium thickness the prior art has resorted to various arrangements for stretching the glass ribbon while still in a viscous state on the molten metal. These arrangements usually involve engaging marginal edge portions of the ribbon with mechanical devices, usually toothed rolls. The contact between the glass ribbon and these mechanical devices is believed to create disturbances in the ribbon as well as the molten metal pool which cause optical distortion to be imparted to the glass. It would be highly desirable to eliminate the disturbances caused by attenuating devices and to thereby improve the optical quality of the glass produced.

The use of super-atmospheric gas pressure for attenuating glass has been suggested in the prior art, for example, in U.S. Pat. Nos. 3,241,937 (Michalik et al.); 3,241,938 (Michalik); 3,241,939 (Michalik); 3,248,197 (Michalik et al.); 3,345,149 (Michalik et al.); 3,615,315 (Michalik et al.); 3,749,563 (Stingelin); 3,883,338 (Stingelin); 3,885,944 (Stingelin); 3,432,283 (Galey). In each of these prior art arrangements a higher pressure is maintained over central portions of the glass ribbon than along marginal regions of the ribbon. This entails use of a plenum pressurized with gas overlying the ribbon of the glass and having edges closely spaced above the glass ribbon defining a peripheral slot through which the pressurized gas escapes. Because of the large volume of gas escaping, such arrangements have been less practical than would be desired for widespread commercial application. In one of the above mentioned U.S. patents, No. 3,432,283, there is shown an auxiliary pressure sizing chamber for speeding the spreading of the initially deposited mass of molten glass. However, since the mass of glass is initially very thick, a subsequent pressure sizing chamber is required in order to obtain the desired less than equilibrium thickness in the glass sheet. Instead of enlarging the pressure sizing chamber as in that patent, it would be desirable to size the glass in as short a length as possible in order to minimize the size of the molten metal bath and to minimize the volume of pressurized gas that must be supplied for the sizing process. Because the atmosphere in the forming chamber is a non-oxidizing gas in order to avoid oxidation of the molten metal, minimizing the volume used is an important cost factor. Furthermore, pressure sizing the glass from a relatively thick initial deposit on the molten metal as in the prior art requires pressures within the pressure sizing chambers greater than would be desired. High pressures within the pressure sizing chamber lead to high velocity escape of gases through the peripheral openings between the pressure chamber walls and the glass in the prior art arrangements which, in turn, leads to detrimentally high gas usage. Unduly large volumes of gas throughput can also lead to excessive cooling of the forming chamber unless considerable amounts of energy are employed to preheat the gas.

U.S. Pat. No. 3,841,857 discloses a method for attenuating glass by blasts of gas on both sides of a glass ribbon. Such an approach, however, foregoes the benefits of a molten metal float bath for providing surface smoothness.

SUMMARY OF THE INVENTION

In the present invention, a ribbon of molten glass is initially deposited onto a molten metal bath at substantially its final width. The initial zone of the float bath is maintained under super-atmospheric pressure and the glass contacts the side walls of the pressurized float chamber throughout its length. The glass ribbon attains below equilibrium thickness in the pressurized chamber due to the super-atmospheric pressure, and the glass separates from the side walls as it exits the pressurized chamber. Downstream from the pressurized chamber the sized glass ribbon is restrained against lateral shrinking until it has cooled to a dimensionally stable condition.

Compared to conventional mechanical attenuating devices, the pressure sizing technique of the present invention introduces less distortion-causing perturbation in the molten glass/molten metal system. By maintaining the glass in contact with the side walls of the pressure sizing chamber, escape of gas along the sides of the glass ribbon is eliminated, thereby conserving on gas usage and expediting attainment of pressures within the chamber. Additionally, since the invention involves metering the glass onto the molten metal at substantially full width, less sizing need take place within the pressure chamber, and therefore a pressure chamber of reduced size may be employed. The use of a smaller pressure chamber and the use of less gas result in significant economic advantages.

A preferred mode of carrying out the pressure sizing method of the present invention entails delivery of molten glass to the pressure sizing chamber at temperatures higher than those customarily employed in float processes, i.e., at least 2100° F. (1150° C.) and preferably at least 2300° F. (1260° C.). At the low glass viscosities accompanying such high temperatures the super-atmospheric pressure in the pressure chamber has a rapid effect on the glass thickness so that thickness reduction can be achieved in a short period of time and, accordingly, the length of the pressure chamber may be relatively short. The low viscosity also permits any perturbations introduced by delivering the molten glass onto the molten metal to flow out rapidly. These temperatures are higher than those at which conventional edge gripping attenuating devices are effective.

In a conventional glassmaking operation, a chamber known as a refiner or conditioner is interposed between the melting furnace and the forming chamber, the function of at least a substantial portion being to permit the glass to cool from a melting temperature to a temperature suitable for forming. But when the glass is formed at higher than conventional temperatures as is permitted by the present invention, the cooling function of the refiner/conditioner is reduced and, thus, it may be reduced in size, thereby effecting further economies.

Unlike conventional attenuating methods where the glass ribbon must be maintained at a suitable temperature for attenuation along a considerable length of the forming chamber, the glass ribbon in the present invention exits the pressure chamber substantially completely attenuated, and then may be cooled as rapidly as possible to render it dimensionally stable. Accordingly, the overall forming chamber length may advantageously be considerably less than that of a conventional float forming process.

Another aspect of sizing the glass at relatively high temperatures is that the sized glass may leave the pressure chamber at temperatures comparable to those at which glass enters conventional float forming processes, e.g., 1900° F. (1040° C.) to 2100° F. (1150° C.). Such high temperatures and the accompanying low glass viscosities following attenuating permit surface distortions that may have been produced by the attenuating process of flow out.

Another aspect of the preferred embodiment of the present invention is metering of glass over tin. In a conventional float forming operation molten glass is metered into the forming chamber through a slit defined by a movable tweel above and a threshold or lip on the underside. In the preferred embodiment of the present invention, however, a threshold is employed merely for containment of the molten metal of the forming chamber, and metering of the molten glass is carried out by means of a tweel that overlies a portion of the molten metal bath. This preferred mode of metering molten glass is particularly significant in combination with the feature of high temperature forming since at such high temperatures the dynamic erosion of the glass on a refractory slot would be severe.

THE DRAWINGS

DETAILED DESCRIPTION

Figure 1:
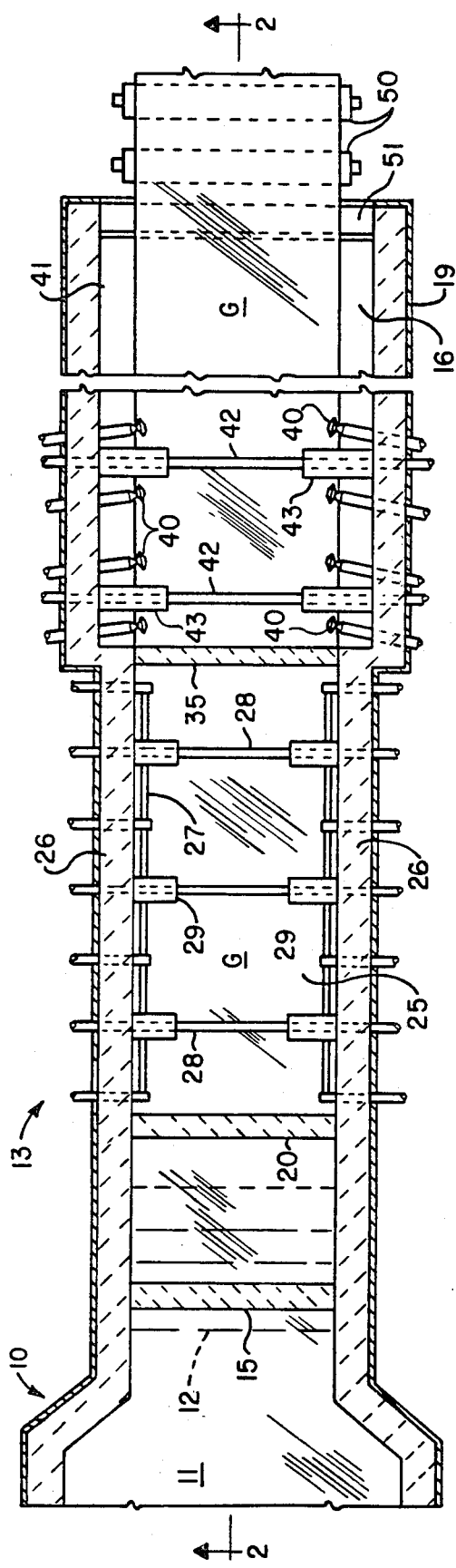
FIG. 1 is a schematic plan view with the top cut away of an embodiment of the float glass forming operation of the present invention.
Figure 2:
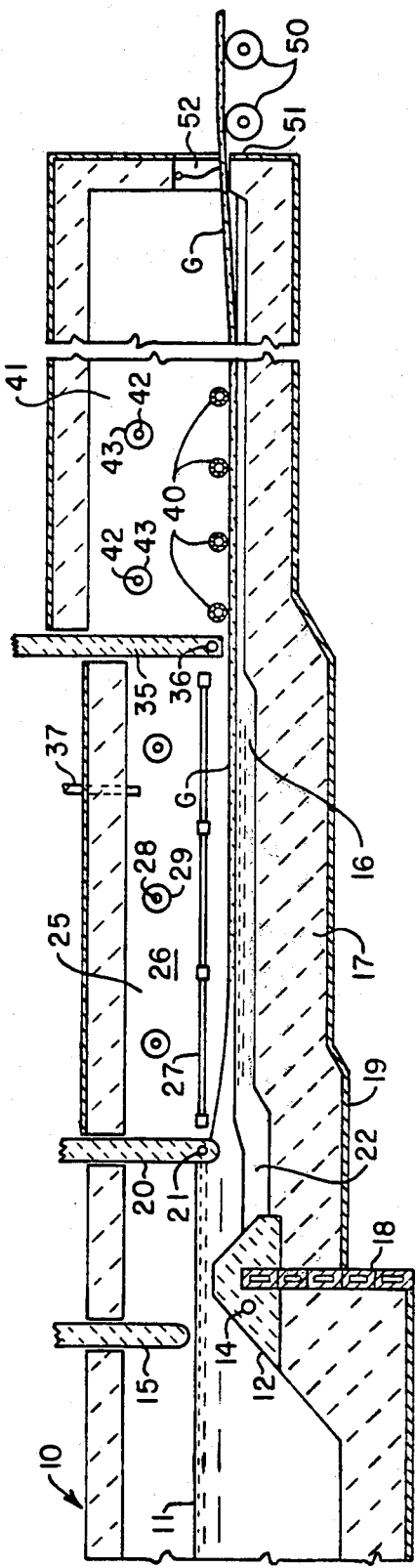
FIG. 2 is a longitudinal cross-section of the float glass forming operation of FIG. 1 taken along line 2—2 in FIG. 1.

A detailed description of the invention will be made with reference to a specific preferred embodiment as shown in FIGS. 1 and 2. It should be understood that the invention may take various other specific forms.

In FIGS. 1 and 2 a refiner or conditioner 10 contains a body of molten glass 11. A threshold member 12 separates the conditioner or refiner 10 from the forming chamber designated generally as 13. The threshold may include a conduit 14 for the passage of cooling medium. As is the conventional practice, a cut-off tweel 15 may be provided for shutting off the flow of molten glass from the conditioner into the forming chamber. In the forming chamber a bath or pool of molten metal 16 is contained within a refractory basin 17. The molten metal is tin or an alloy thereof such as tin/copper alloys. Coolers 18 aid containment of the molten metal at the hot end of the forming chamber. Oxidation of the molten metal is retarded by providing a non-oxidizing atmosphere (e.g., nitrogen or forming gas) within the forming chamber. Maintenance of the non-oxidizing atmosphere within the forming chamber is assisted by a gas tight casing 19 around the forming chamber.

In the preferred embodiment, as shown in FIG. 2, molten glass from the conditioner 10 is metered into the forming chamber 13 by a metering tweel 20 which may be provided with a conduit 21 in its lower portion for circulating coolant in order to extend its life. The tweel 20 overlies a deep portion 22 of the molten metal in the basin 17, and the distance between the lower edge of the tweel and the underlying molten metal may be adjusted by vertical movement of the tweel so as to establish a predetermined flow rate of molten glass into the forming chamber. The molten glass is delivered to the full width of the first zone of the forming chamber, which is a pressure chamber 25 in which the glass G is maintained in contact with the side walls 26. Maintaining glass contact with the side walls may be assisted by employing wettable materials for the side walls (most ceramic refractory materials) and by avoiding use of non-wettable materials, such as graphite. Fluidity of the glass along the sides may be assisted by edge heating means such as the bar type electrical resistance heaters 27 shown in the drawings. Coolers may be provided in the pressure forming chamber to begin cooling the glass, and preferably the cooling is directed toward center portions of the glass ribbon. In the arrangement shown, the coolers are comprised of conduits 28 for carrying water or other heat transfer medium provided with sleeves 29 of insulating material at each end.

The downstream end of the pressure sizing chamber 25 is closed by a vertically adjustable exit seal 35. The bottom edge of the exit seal 35 is spaced a small distance (e.g., a few millimeters) above the top surface of the glass ribbon to minimize leakage of the pressurized atmosphere from the pressure sizing chamber. In order to extend the life of the exit seal and to cool the glass leaving the pressure chamber, the exit seal 35 may be provided with a conduit 36 for passage of a cooling medium. Except for the gap under the exit seal, the pressure sizing chamber 25 is essentially gas tight, thereby permitting imposition of pressures greater than atmospheric. Pressurized gas may be introduced to the pressure sizing chamber through a conduit 37. As in conventional float forming operations, the atmosphere in the pressure chamber 25 as well as the remainder of the forming chamber is preferably a non-oxidizing atmosphere such as nitrogen or forming gas.

Molten glass spreads on molten metal until it attains an equilibrium thickness in accordance with the following relationship:

$$h_1^2 = \frac{2\rho_t(S_1 + S_2 - S_3)}{\rho_g g(\rho_t - \rho_g)}$$

where
$h_1$ = equilibrium glass thickness
$\rho_t$ = density of molten metal
$\rho_g$ = density of molten glass
$S_1$ = atmosphere-glass surface tension (dynes/cm)
$S_2$ = glass-metal surface tension
$S_3$ = atmosphere-metal surface tension
$g$ = acceleration of gravity For conventional soda/lime/silica flat glass on molten tin, the equilibrium thickness is about 0.27 inches (6.8 millimeters). Increasing the pressure on the glass has the apparent effect of increasing the density of the glass. Therefore, in accordance with the equation above, an increase in the apparent density of the glass results in a smaller equilibrium glass thickness. The reduced glass thickness may be calculated as follows:

$$h_2 = h_1 - \frac{P_2 - P_1}{\rho_g g}$$

where
- $h_1$ = equilibrium glass thickness
- $h_2$ = reduced glass thickness
- $P_1$ = atmospheric pressure
- $P_2$ = pressure in pressure sizing chamber
- $\rho_g$ = density of glass
- $g$ = acceleration of gravity It may be noted that the atmospheric pressure $P_1$ in the equation above is actually the pressure on the exposed molten metal within the forming chamber outside the pressure sizing zone and may be slightly above the natural atmospheric pressure outside the forming chamber. Within the pressure sizing chamber no portion of the molten metal is exposed to the pressurized atmosphere. Small pressure differences yield significant reductions in glass thickness as may be seen in the following table of examples:

| $P_2 - P_1$ (mm water column) | Glass Thickness (mm) |
|---|---|
| 1.8 | 6.3 |
| 2.5 | 5.8 |
| 3.8 | 5.3 |
| 5.1 | 4.8 |
| 6.4 | 4.3 |
| 7.6 | 3.8 |
| 8.9 | 3.3 |
| 10.2 | 2.8 |
| 11.4 | 2.3 |
| 12.7 | 1.8 |
| 14.0 | 1.3 |
| 15.2 | 0.8 |
| 16.5 | 0.3 |

Pressure sizing is carried out economically in the present invention in part due to the fact that molten glass is metered into the pressure forming chamber at substantially full width. By "substantially full width" is meant that the width of the glass stream within the pressure sizing chamber is at least 90% of the final width of the formed glass ribbon being withdrawn from the forming chamber. Because the glass has been spread to substantially its full width by the metering function, the residence time of the glass within the pressure sizing chamber may be devoted entirely to thinning the glass ribbon. Accordingly, the pressure sizing chamber may be relatively compact.

In preferred embodiments of the invention, the economy and compactness of the pressure sizing chamber are further enhanced by delivering the molten glass into the pressure sizing chamber at temperatures considerably higher than those conventionally employed for float forming. In conventional float processes, the molten glass is delivered onto the molten metal typically at about 2000° F. (1090° C.), but in the preferred embodiments of the present invention the delivery temperature is in excess of 2100° F. (1150° C.) and most preferably above 2300° F. (1260° C.). Even higher temperatures could be employed to advantage, but temperatures may be limited by the durability of conventional refractory materials. Higher temperatures do not affect the final glass thickness, but the reduced viscosities which accompany high temperatures permit the glass to attain the final thickness in a shorter period of time. Therefore, less residence time is required in the pressure sizing chamber and the pressure sizing chamber may be of reduced length. These temperatures refer to conventional soda/lime/silica flat glass and will differ for other glass compositions. The use of unusually high temperatures for sizing is made possible by the fact that pressure sizing does not require mechanical engagement of the glass ribbon.

As the ribbon of glass G is drawn out of the pressure chamber 25 it enters a cooling zone 41 in which a pressure lower than that of the pressure chamber is maintained. The glass separates from the sidewalls as it enters zone 41. In the reduced pressure environment, the ribbon has a tendency to shrink in width and increase in thickness as long as the temperature of the glass remains sufficiently high for the glass to be in a plastic state. Therefore, it is necessary to maintain the ribbon width by forces applied to the edges, such as by edge roll means 40, until the glass has cooled to a substantially stable condition. When the glass passes from the pressure sizing chamber, it should be at a temperature suitable for engagement by the edge retaining devices, typically below about 1900° F. (1040° C.). Thus, the glass may be permitted to cool considerably as it passes through the pressure sizing chamber and as it passes into the downstream zone 41 it may be further cooled as rapidly as practical since attenuation is complete at that point. The accelerated cooling may be aided by coolers 42 which may optionally be provided with insulating sleeves 43 adjacent to the side walls of the chamber 41. In comparison with conventional float attenuating techniques where the glass ribbon must be maintained at temperatures suitable for attenuation, e.g., above about 1500° F. (815° C.), along a considerable length of the float chamber, the ability to rapidly cool the glass ribbon emerging from the pressure chamber in the present invention results in an advantageously short forming chamber.

At the exit end of the forming chamber, conventional means such as lift-out rolls 50 may be provided for lifting the dimensionally stable ribbon of glass G from the molten metal over a lip 51 at an exit opening 52.

It is contemplated that one variation of the present invention may entail a pressure sizing chamber in which the side walls taper away from one another so that the glass may increase in width slightly as it is reduced in thickness. In such an embodiment, the widening of the ribbon in the pressure sizing chamber represents a minor portion of the overall attenuation and, thus, would not be considered to depart from the principle that the glass is metered into the pressure sizing chamber at substantially full width.

Other modifications as are known to those of skill in the art may be resorted to without departing from the scope of the invention as defined by the claims which follow.

We claim:

1. A method of producing float glass of less than equilibrium thickness comprising: continuously metering a stream of molten glass through an opening having a width not substantially less than the final product glass width, and depositing the stream of glass onto a molten metal pool within a pressure chamber including side basin walls for containing the molten metal, and maintaining the molten glass in the pressure chamber in contact with the side basin walls so as to cover the entire surface of the molten metal pool within the pressure chamber and to separate the molten metal from a gas space above and essentially coextensive with the molten metal pool in the pressure chamber; imposing a pressure greater than atmospheric on the molten glass in the pressure chamber by pressurizing the gas space, so as to reduce the thickness of the glass as it passes through the pressure chamber to a thickness less than the equilibrium thickness; withdrawing the glass as a thinned ribbon from the pressure chamber to a cooling chamber where the pressure is lower than in the pressure chamber, and in the cooling chamber supporting the glass ribbon on molten metal while restraining the ribbon against lateral shrinkage until the ribbon has cooled to a dimensionally stable condition; and withdrawing the dimensionally stable glass ribbon from the cooling chamber.

2. A method of making an attenuated ribbon of flat glass comprising: delivering a stream of molten glass at a temperature of at least 2100° F. (1150° C.) onto a molten metal support within a pressure chamber wherein the glass spreads to form a layer in contact with said basin walls containing the molten metal in the pressure chamber; subjecting the glass layer to superatmospheric pressure by pressurizing a gas space above and essentially coextensive with the molten metal in the pressure chamber so as to reduce the thickness of the glass layer to a thickness less than the equilibrium thickness; discharging the glass as a thinned ribbon from the pressure chamber to a cooling chamber of lower pressure than the pressure chamber, and in the cooling chamber supporting the glass ribbon on molten metal while restraining the ribbon against lateral shrinkage until the ribbon has cooled to a dimensionally stable condition; and withdrawing the attenuated glass ribbon from the cooling chamber.

3. The method of claim 1 or 2 wherein the molten glass enters the pressure chamber at a temperature of at least 2300° F. (1260° C.).

4. The method of claim 1 wherein the molten glass enters the pressure chamber at a temperature of at least 2100° F. (1150° C.).

5. The method of claim 2 or 4 wherein attenuation of the glass is substantially completed before the glass temperature falls below 1900° F. (1040° C.).

6. The method of claim 1 or 2 wherein the molten glass stream being passed into the pressure chamber is supported by molten metal before entering the pressure chamber.

7. The method of claim 6 wherein the stream of molten metal is metered into the pressure chamber through an opening defined by a horizontally elongated refractory member on the upper side and a pool of molten metal on the underside.

8. Apparatus for producing float glass of less than equilibrium thickness comprising a forming chamber having a basin adapted to hold a pool of molten metal, the forming chamber including a pressure chamber encompassing an upstream portion of the molten metal pool, and a cooling chamber encompassing a downstream portion of the molten metal pool, the downstream end of the pressure chamber being closed by a vertically extending seal wall spaced slightly above the elevation of the molten metal only a sufficient distance to permit passage of a ribbon of glass therebetween but insufficient to permit substantial escape of pressurized gas from the pressure chamber, at least a portion of the cooling chamber basin having a width greater than the maximum width of the pressure chamber basin, an entrance opening between a source of molten glass and the pressure chamber adapted to admit molten glass into the pressure chamber and prevent escape of pressurized gas from the pressure chamber, the entrance opening having a width substantially as great as the width of the pressure chamber, an essentially enclosed gas space overlying and essentially coextensive with the portion of the basin in the pressure chamber, means to impose a pressure in the pressure chamber gas space greater than in the cooling chamber, means in the cooling chamber for engaging edge portions of a glass ribbon emerging from the pressure chamber and for restricting lateral shrinking of the glass ribbon, and an exit opening in the cooling chamber through which the glass ribbon may be withdrawn from the pool of molten metal.

* * * * *